(12) United States Patent
Kim et al.

(10) Patent No.: US 11,684,890 B2
(45) Date of Patent: Jun. 27, 2023

(54) METHANE-SELECTIVE MIXED MATRIX MEMBRANES INCLUDING NANOPOROUS METAL-ORGANIC FRAMEWORK MATERIALS TO WHICH A METHANE-SELECTIVE FUNCTIONAL GROUP IS INTRODUCED, THE USE THEREOF, AND A METHOD OF PREPARING THE SAME

(71) Applicant: KOREA RESEARCH INSTITUTE OF CHEMICAL TECHNOLOGY, Daejeon (KR)

(72) Inventors: Jeong Hoon Kim, Daejeon (KR); Chang In Kong, Daejeon (KR); Yang No Yun, Daejeon (KR); Su Young Moon, Seongnam-si (KR); Bong Jun Chang, Daejeon (KR); Bo Ryoung Park, Daejeon (KR); Youn-Sang Bae, Seoul (KR); Tea-Hoon Kim, Seoul (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 576 days.

(21) Appl. No.: 16/827,560

(22) Filed: Mar. 23, 2020

(65) Prior Publication Data
US 2020/0306689 A1   Oct. 1, 2020

(30) Foreign Application Priority Data
Mar. 25, 2019   (KR) .................. 10-2019-0033805

(51) Int. Cl.
*B01D 53/22*   (2006.01)
*B01D 71/00*   (2006.01)
(Continued)

(52) U.S. Cl.
CPC ....... *B01D 53/228* (2013.01); *B01D 67/0079* (2013.01); *B01D 67/0083* (2013.01);
(Continued)

(58) Field of Classification Search
CPC ............ B01D 2257/7025; B01D 69/12; B01D 2325/20; B01D 67/0083; B01D 53/228;
(Continued)

(56) References Cited

U.S. PATENT DOCUMENTS 10,495,592 B1 * 12/2019 Peterson ............ G01N 33/0037
11,007,391 B1 *  5/2021 Peterson ............... C07F 19/005
(Continued)

FOREIGN PATENT DOCUMENTS

KR   20160068552 A   6/2016

OTHER PUBLICATIONS

Ameloot, R. et al., "Ionic Conductivity in the Metal-Organic Framework UiO-66 by Dehydration and Insertion of Lithium tert-Butoxide," Chemistry, vol. 19, No. 18, Apr. 26, 2013, Available Online Mar. 12, 2013, 5 pages.
(Continued)

*Primary Examiner* — Anthony R Shumate
(74) *Attorney, Agent, or Firm* — McCoy Russell LLP

(57) ABSTRACT

Provided are a methane-selective composite membrane comprising: a UiO-66 type organic-inorganic composite nanoporous material, a MIL-100 type organic-inorganic composite nanoporous material, or a ZIF-8 type organic-inorganic composite nanoporous material to which a methane-selective functional group is introduced for selectively separating methane from a gas mixture containing methane/nitrogen, a use thereof, and a method of preparing the same.

7 Claims, 2 Drawing Sheets
(1 of 2 Drawing Sheet(s) Filed in Color)

(51) Int. Cl.
  *B01D 67/00* (2006.01)
  *B01D 69/12* (2006.01)

(52) U.S. Cl.
  CPC ............ *B01D 69/12* (2013.01); *B01D 71/00* (2013.01); *B01D 2257/7025* (2013.01); *B01D 2325/02* (2013.01); *B01D 2325/20* (2013.01)

(58) Field of Classification Search
  CPC . B01D 67/0079; B01D 2325/02; B01D 71/00
  See application file for complete search history.

(56) References Cited

U.S. PATENT DOCUMENTS

| | | | |
|---|---|---|---|
| 2011/0138999 A1 | 6/2011 | Willis | |
| 2015/0101986 A1* | 4/2015 | Odeh | B01D 71/64 96/10 |
| 2015/0369746 A1* | 12/2015 | Azzazy | G01N 21/78 436/103 |
| 2016/0340181 A1* | 11/2016 | Ornstein | C01B 3/0015 |
| 2016/0354731 A1 | 12/2016 | Mochizuki | |
| 2016/0367948 A1* | 12/2016 | Song | B01D 69/148 |
| 2018/0126337 A1* | 5/2018 | Beavers | B01D 67/0079 |
| 2020/0114189 A1* | 4/2020 | Ryu | A62D 3/34 |
| 2020/0353440 A1* | 11/2020 | Yaghi | B01J 37/04 |
| 2021/0138433 A1* | 5/2021 | Usman | B01D 53/04 |
| 2021/0269462 A1* | 9/2021 | Giri | D06M 13/50 |
| 2021/0386055 A1* | 12/2021 | Guo | B01J 20/226 |
| 2022/0306955 A1* | 9/2022 | Koros | B01D 67/0093 |

OTHER PUBLICATIONS

Cmarik, G. et al., "Tuning the Adsorption Properties of UiO-66 via Ligand," Langmuir, vol. 28, No. 44, Oct. 11, 2012, 8 pages.

Yang, Q. et al., "Functionalizing porous zirconium terephthalate UiO-66(Zr) for natural gas upgrading: a computational exploration," Chemical Communications, vol. 47, No. 34, Jul. 29, 2011, 3 pages.

Abid, H. et al., "Adsorption of CH4 and CO2 on Zr-metal organic frameworks," Journal of Colloid and Interface Science, vol. 366, No. 1, Jan. 2012, Available Online Oct. 2, 2011, 5 pages.

* cited by examiner

METHANE-SELECTIVE MIXED MATRIX MEMBRANES INCLUDING NANOPOROUS METAL-ORGANIC FRAMEWORK MATERIALS TO WHICH A METHANE-SELECTIVE FUNCTIONAL GROUP IS INTRODUCED, THE USE THEREOF, AND A METHOD OF PREPARING THE SAME

CROSS-REFERENCE TO RELATED APPLICATION

This application claims priority to Korean Patent Application No. 10-2019-0033805 filed on Mar. 25, 2020. The entire contents of the above-listed application is incorporated herein by reference for all purposes.

TECHNICAL FIELD

The following disclosure relates to methane-selective mixed matrix membranes including metal-organic framework or zeolitic imidazolate framework (ZIF) materials to which a methane-selective functional group is introduced, a use thereof, and a method of preparing the same.

BACKGROUND

By-product gases from the steel industry and the chemical industry and gases produced from biomass and organic waste include methane, carbon monoxide, carbon dioxide, nitrogen, and the like in high concentrations. These gases are mainly used for low value-added power generation, which causes a large amount of carbon dioxide to be produced. In order to produce a high value-added chemical product from methane which is used for a low value-added product to become a source of greenhouse gas, a separation material and a process technique which allow high-purity methane at a chemical raw material level to be economically recovered from a mixed gas having various compositions are important.

Cryogenics are currently used as a method of separating methane/nitrogen from industrial by-product gases and carbon waste resources. However, cryogenics has a demerit in that initial installation costs and operating costs are very expensive.

However, a separation technique using a membrane has a principle and a process which are relatively simple and has a wide coverage, and thus, is used a lot in a liquid and gas separation process. Among them, since gas separation may have an economical effect such as reduction in energy usage and operating costs as compared with a conventional gas separation method such as a liquid distillation method, an extraction method, and an adsorption method, it is one of the most studied fields recently. In particular, a polymer membrane has a merit of selectively separating a certain gas from a gas mixture depending on a difference in gas permeability rates of various gas molecules.

However, in spite of these merits, since the polymer materials for a membrane which have been known to date have a limitation in permeability and selectivity, it is expected to be difficult to exceed the performance of the conventional commercialized membrane as long as the permeability and selectivity are not improved. In general, all materials show a very traditional trade-off phenomenon in the gas membrane separation field, in which selectivity is decreased as permeability is increased, while selectivity is increased as permeability is decreased.

Therefore, high selectivity, permeability, and mechanical strength should be provided by the conditions of a high performance membranes. However, since these three properties have a mutually exclusive characteristic, there was a limitation in the development by conventional techniques. For the past 30 years, though numerous scientists have put much effort into overcoming the limitation in selectivity and permeability of the polymer gas membrane, they have not gained success.

Recently, in order to solve the problems, many studies for membrane materials are being conducted, and among them, a mixed-matrix membranes (MMMs) is studied prepared by mixing an metal-organic framework(MOF) or a zeolitic imidazolate framework (ZIF) material with a polymer for overcoming the limitation of the polymer material.

However, the mixed-matrix membrane(MMM) study for selectively separating methane from a mixed gas containing nitrogen, for industrial by-product gases or natural gas, has been almost not studied.

Thus, the present inventors studied a separation material which allows high-purity methane to be selectively economically recovered from a mixed gas having various compositions, and then developed a methane-selective mixed matrix membrane including a metal-organic framework (MOF) or a zeolitic imidazolate framework (ZIF) material such as a UiO-66 type organic-inorganic composite nanoporous material, a MIL-100 type organic-inorganic composite nanoporous material, or a ZIF-8 type organic-inorganic composite nanoporous material, to which a methane-adsorptive functional group is introduced, and found that the methane-selective mixed matrix membrane has excellent methane separation performance from a mixed gas containing nitrogen, thereby completing the present invention.

SUMMARY

An embodiment of the present invention is directed to providing a methane-selective mixed matrix membrane including a metal-organic framework (MOF) or a zeolitic imidazolate framework (ZIF) material such as material such as a UiO-66 type organic-inorganic composite nanoporous material, a MIL-100 type organic-inorganic composite nanoporous material, or a ZIF-8 type organic-inorganic composite nanoporous material including an excellent methane adsorptive functional group and a polymer matrix.

Another embodiment of the present invention is directed to providing a method of preparing a methane-selective mixed matrix membrane having high selectivity to methane, and a method of separating or concentrating methane from a mixed gas containing methane and nitrogen thereby.

Still another embodiment of the present invention is directed to providing an apparatus for separating or concentrating methane from a mixed gas containing methane and nitrogen, using the methane-selective composite membrane.

In order to solve the above problems, various metal organic framework (MOF) or zeolite imidazolate framework (ZIF) organic-inorganic composite nanoporous bodies have been noted, and as a result, in one general aspect, a methane-selective mixed matrix membrane includes a metal organic framework (MOF) or zeolitic imidazolate framework (ZIF) organic-inorganic composite nanoporous material having one or more methane-selective functional groups selected from the group consisting of —Br, —NH2, —I, and —NO2; and a polymer matrix has been designed.

In the methane-selective composite membrane according to an exemplary embodiment of the present invention, it is preferred that the UiO-66 type organic-inorganic composite nanoporous material, the MIL-100 type organic-inorganic composite nanoporous material, or the ZIF-8 type organic-inorganic composite nanoporous material independently of each other includes a UiO-66 skeleton, a MIL-100 skeleton, or a ZIF-8 skeleton having one or more methane-selective functional groups selected from the group consisting of —Br, —NH$_2$, —I, and —NO$_2$.

Preferably, the methane-selective composite membrane according to an exemplary embodiment of the present invention, the UiO-66 type organic-inorganic composite nanoporous material, may include one or more selected from the group consisting of Ui0-66_Br, Ui0-66_2Br, Ui0-66_NH2, Ui0-66_2NH2, Ui0-66_I, Ui0-66_2I, Ui0-66_NO2, and Ui0-66_2NO2.

The MIL-100 type organic-inorganic composite nanoporous material according to an exemplary embodiment of the present invention may include one or more selected from MIL-100_Br, MIL-100_NH2, MIL-100_I, MIL-100_COOH, MIL-100_NO2, and MIL-100_2Br which are substituted with —Br, —NH2, —I, —COOH, and —NO2 groups, respectively, on one aromatic ring in a MIL-100 skeleton, and the ZIF-8 type organic-inorganic composite nanoporous material may include one or more selected from ZIF-8_Br, ZIF-8_2Br, ZIF-8_NH2, ZIF-8_I, and ZIF-8_NO2, which are substituted with —Br, —NH2, —I, —COOH, and —NO2 groups, respectively, on one aromatic ring in a ZIF-8 skeleton.

In the methane-selective composite membrane according to the exemplary embodiment of the present invention, the polymer matrix may be one or more rubbery polymers selected from the group consisting of a polyether-polyamide block copolymer (PEBAX), a styrene-butadiene-styrene block copolymer (SBS), polydimethylsiloxane (PDMS), poly(para-silphenylene siloxane), and poly(siloctylene siloxane).

In the methane-selective mixed matrix membrane according to the exemplary embodiment of the present invention, the polymer matrix may be one or more vitreous polymers selected from the group consisting of polyimide, polybenzimidazole, polysulfone, polyamide, and polybenzoxazole.

In the methane-selective mixed matrix membrane according to an exemplary embodiment of the present invention, 1 to 50 wt % of the UiO-66 type organic-inorganic composite nanoporous material, the MIL-100 type organic-inorganic composite nanoporous material, or the ZIF-8 type organic-inorganic composite nanoporous material having one or more methane-selective functional groups selected from the group consisting of —Br, —NH$_2$, —I, and —NO$_2$ may be included in the state of being dispersed in the polymer matrix, based on the total weight of the methane-selective composite membrane.

The methane-selective mixed matrix membrane according to an exemplary embodiment of the present invention may be in the form of a multilayer structure.

In the methane-selective mixed matrix membrane according to an exemplary embodiment of the present invention, the multilayer structure may include a first layer including 5 to 20 wt % of the UiO-66 type organic-inorganic composite nanoporous material, the MIL-100 type organic-inorganic composite nanoporous material, or the ZIF-8 type organic-inorganic composite nanoporous material, a second layer disposed on the first layer, including 5 to 10 wt % of the UiO-66 type organic-inorganic composite nanoporous material, the MIL-100 type organic-inorganic composite nanoporous material, or the ZIF-8 type organic-inorganic composite nanoporous material, and a third layer disposed on the second layer, including 1 to 10 wt % of the UiO-66 type organic-inorganic composite nanoporous material, the MIL-100 type organic-inorganic composite nanoporous material, or the ZIF-8 type organic-inorganic composite nanoporous material, based on the total weight of the methane-selective composite membrane.

The methane-selective mixed matrix membrane according to an exemplary embodiment of the present invention may have a methane permeability of 6 or more barrer and a methane/nitrogen selectivity of 5 or more barrer from a mixed gas containing methane and nitrogen.

In another general aspect, a method of preparing a methane-selective composite membrane includes:
(a) dissolving a polymer in a solvent to prepare a polymer solution;
(b) dispersing the UiO-66 type organic-inorganic composite nanoporous material, the MIL-100 type organic-inorganic composite porous material, or the ZIF-8 type organic-inorganic composite nanoporous material having one or more methane-selective functional groups selected from the group consisting of —Br, —NH$_2$, —I, and —NO$_2$ in a solvent to prepare a UiO-66 type organic-inorganic composite nanoporous material dispersion, a MIL-100 type organic-inorganic composite nanoporous material dispersion, or a ZIF-8 type organic-inorganic composite nanoporous material dispersion;
(c) adding the polymer solution to the UiO-66 type organic-inorganic composite porous material dispersion, the MIL-100 type organic-inorganic composite nanoporous material dispersion, or the ZIF-8 type organic-inorganic composite nanoporous material dispersion to prepare a mixed solution; and
(d) molding the mixed solution to prepare a composite membrane.

In the method of preparing a methane-selective mixed matrix membrane according to an exemplary embodiment of the present invention, the polymer may be one or more rubbery polymers selected from the group consisting of a polyether-polyamide block copolymer (PEBAX), a styrene-butadiene-styrene block copolymer (SBS), polydimethylsiloxane (PDMS), poly(para-silphenylene siloxane), and poly(siloctylene siloxane), or one or more vitreous polymers selected from one or more vitreous polymer groups selected from the group consisting of polyimide, polybenzimidazole, polysulfone, polyamide, and polybenzoxazole.

In the method of preparing a methane-selective mixed matrix membrane according to an exemplary embodiment of the present invention, the contents of the UiO-66 type organic-inorganic composite nanoporous material, the MIL-100 type organic-inorganic composite nanoporous material, and the ZIF-8 type organic-inorganic composite nanoporous material may be 1 to 50 wt %, based on the total weight of the methane-selective composite membrane.

The method of preparing a methane-selective mixed matrix membrane according to an exemplary embodiment of the present invention may further include a step of repeating step (d) to prepare a composite membrane having a multilayer structure.

The method of preparing a methane-selective mixed matrix membrane according to an exemplary embodiment may further include step (e) of annealing and vacuum treating after step (d).

In another general aspect, a method of selectively separating or concentrating methane from a mixed gas containing methane and nitrogen includes using a methane-selective composite membrane.

In still another general aspect, an apparatus for separating or concentrating methane includes a methane-selective composite membrane.

Other features and aspects will be apparent from the following detailed description, the drawings, and the claims.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
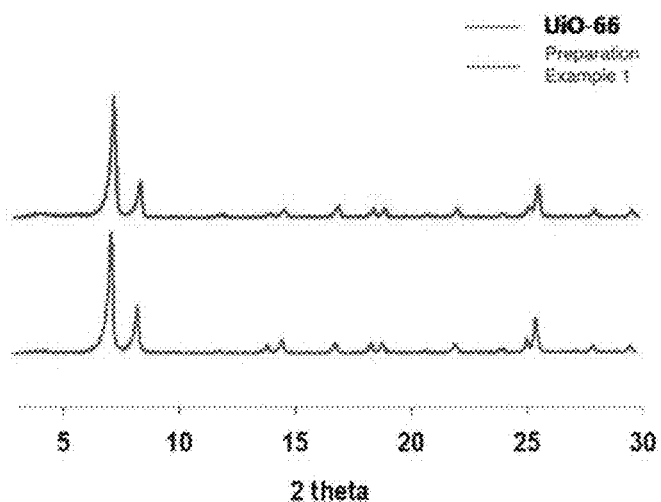
FIG. 1 is an X-ray diffraction (XRD) pattern graph representing whether the UiO-66 type organic-inorganic composite nanoporous material of Preparation Example 1 was synthesized, as compared with UiO-66, using XRD analysis.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a methane-selective mixed matrix membrane including: a UiO-66 type organic-inorganic composite nanoporous material, a MIL-100 type organic-inorganic composite nanoporous material, or a ZIF-8 type organic-inorganic composite nanoporous material; and a polymer matrix, having a methane-selective functional group, will be described in detail. Technical terms and scientific terms used herein have the general meaning understood by those skilled in the art to which the present invention pertains unless otherwise defined, and a description for the known function and configuration which may unnecessarily obscure the gist of the present invention will be omitted in the following description and the accompanying drawings.

The term used in the present specification, "organic-inorganic composite nanoporous material" means a crystalline compound including both an organic material and an inorganic material in a skeletal structure and having a nanopore structure having a molecular size or at a nanometer level, which is a nanoporous metal-organic framework having a one-dimensional, two-dimensional, or three-dimensional structure formed by a center metal ion being coordinately bonded to an organic ligand.

When a functional group is substituted on an aromatic ring of an organic ligand in the UiO-66 skeleton, the MIL-100 skeleton, or the ZIF-8 skeleton of the present invention, it is called "a UiO-66_functional group, a MIL-100_functional group, or a ZIF-8_functional group", and when there are several identical functional groups on one aromatic ring, the number of substitutions is indicated before the "functional group". For example, when —Br, —$NH_2$, —I, —COOH, and —$NO_2$ groups are substituted, respectively, on one aromatic ring in the UiO-66 skeleton of the UiO-66 type organic-inorganic composite porous material, it is indicated as UiO-66_Br, UiO-66_$NH_2$, UiO-66_I, UiO-66 COOH, and UiO-66_$NO_2$, respectively, and when two —BR's are substituted, it is indicated as UiO-66_2Br.

For example, when —Br, —$NH_2$, —I, —COOH, and —$NO_2$ groups are substituted, respectively, on one aromatic ring in the MIL-100 skeleton of the MIL-100 type organic-inorganic composite nanoporous material, it is indicated as MIL-100_Br, MIL-100_$NH_2$, MIL-100_I, MIL-100_COOH, and MIL-100_$NO_2$, respectively, and when two —BR's are substituted, it is indicated as MIL-100_2Br.

For example, when —Br, —NH2, —I, —COOH, and —NO2 groups are substituted, respectively, on one aromatic ring in the ZIF-8 skeleton of the ZIF-8 type organic-inorganic composite nanoporous material, it is indicated as ZIF-8_Br, ZIF-8_2Br, ZIF-8_NH2, ZIF-8_I, and ZIF-8_NO2, respectively, and when two —BR's are substituted, it is indicated as ZIF-8_2Br.

The present invention provides a methane-selective mixed matrix membrane including a UiO-66 type organic-inorganic composite nanoporous material, a MIL-100 type organic-inorganic composite nanoporous material, or a ZIF-8 type organic-inorganic composite porous material having one or more methane-selective functional groups selected from the group consisting of —Br, —$NH_2$, —I, and —$NO_2$, and a polymer matrix.

In the methane-selective mixed matrix membrane according to an exemplary embodiment of the present invention, the UiO-66 type organic-inorganic composite nanoporous material, the MIL-100 type organic-inorganic composite nanoporous material, or the ZIF-8 type organic-inorganic composite nanoporous material may be an organic-inorganic composite porous material including a UiO-66 skeleton, a MIL-100 skeleton, or a ZiF-8 skeleton, and preferably the UiO-66 type organic-inorganic composite nanoporous material, the MIL-100 type organic-inorganic composite nanoporous material, or the ZIF-8 type organic-inorganic composite nanoporous material which is substituted with a methane-adsorptive functional group, and specifically may include one or more selected from Ui0-66_Br, Ui0-66_2Br, Ui0-66_NH2, Ui0-66_2NH2, Ui0-66_I, Ui0-66_2I, Ui0-66_NO2, and Ui0-66_2NO2 which are substituted with —Br, —NH2, —I, —COOH, and —NO2 groups, respectively, on an aromatic ring in the UiO-66 skeleton of the UiO-66 type organic-inorganic composite nanoporous material, include one or more selected from MIL-100_Br, MIL-100_NH2, MIL-100_I, MIL-100_COOH, MIL-100_NO2, and MIL-100_2Br which are substituted with —Br, —NH2, —I, —COOH, and —NO2 groups, respectively on an aromatic ring in the MIL-100 skeleton of the MIL-100 type organic-inorganic composite nanoporous material, or include one or more selected from ZIF-8_Br, ZIF-8_2Br, ZIF-8_NH2, ZIF-8_I, and ZIF-8_NO2 which are substituted with —Br, —NH2, —I, —COOH, and —NO2 groups, respectively, on one aromatic ring in the ZIF-8 skeleton of the ZIF-8 type organic-inorganic composite nanoporous material.

More specifically, the methane-selective mixed matrix membrane may include one or more selected from UiO-66_Br, UiO-66_2Br, UiO-66_I, and UiO-66_2I, and also one or more selected from MIL-100_Br and MIL-100_2Br, and more preferably may include UiO-66_2I, MIL-66_2 I, ZIF-8_Br, ZIF-8_2Br, ZIF-8_I, or ZIF-8_2I.

In the methane-selective mixed matrix membrane according to an exemplary embodiment of the present invention, the polymer matrix may be one or more polymers selected from the group consisting of a polyether-polyamide block copolymer (PEBAX), a styrene-butadiene-styrene block copolymer (SBS), a polydimethylsiloxane (PDMS), poly(methyl propyl siloxane), poly(methyl octyl siloxane), poly(para-silphenylene siloxane), poly(silethylene siloxane), poly(silhexylene siloxane), poly(siloctylene siloxane), poly(para-silphenylene siloxane), and poly(siloctylene siloxane). Preferably, the polymer is a rubbery polymer having a relatively high methane selectivity and may be one or more polymers selected from the group consisting of a polyether-polyamide block copolymer (PEBAX), a styrene-butadiene-styrene block copolymer (SBS), polydimethylsiloxane (PDMS), poly(para-silphenylene siloxane), and poly(siloctylene siloxane), but is not limited thereto.

In the methane-selective mixed matrix membrane according to an exemplary embodiment of the present invention, the polymer matrix may be one or more polymers selected from the group of polyimide, polybenzimidazole, polysulfone, polyamide, and polybenzoxazole. Preferably, the polymer is a vitreous polymer having a relatively high nitrogen selectivity and may be one or more polymers selected from the group consisting of polyimide, polybenzimidazole, polysulfone, polyamide, and polybenzoxazole, but is not limited thereto.

In the methane-selective mixed matrix membrane according to an exemplary embodiment of the present invention, when the polymer matrix is a rubbery polymer having a relatively high methane selectivity, the polymer matrix has a high mutual affinity with the UiO-66 type organic-inorganic composite nanoporous material, the MIL-100 type organic-inorganic composite nanoporous material, or the ZIF-8 type organic-inorganic composite nanoporous material, so that a boundary phase between the polymer and the UiO-66 type organic-inorganic composite nanoporous material, the MIL-100 type organic-inorganic composite nanoporous material, or the ZIF-8 type organic-inorganic composite nanoporous material is not made, and thus, mixing is easy. In addition, since the UiO-66 type organic-inorganic composite nanoporous material, the MIL-100 type organic-inorganic composite nanoporous material, or the ZIF-8 type organic-inorganic composite nanoporous material is uniformly dispersed in the polymer matrix, a methane adsorption property is evenly distributed to improve separation performance of methane.

In the methane-selective mixed matrix membrane according to an exemplary embodiment of the present invention, the UiO-66 type organic-inorganic composite nanoporous material, the MIL-100 type organic-inorganic composite nanoporous material, or the ZIF-8 type organic-inorganic composite nanoporous material may be included at 1 to 50 wt %, preferably 3 to 30 wt %, and more preferably 5 to 20 wt %, based on the total weight of the methane-selective mixed matrix membrane and dispersed in the polymer matrix.

Thus, when the content range of the UiO-66 type organic-inorganic composite nanoporous material, the MIL-100 type organic-inorganic composite nanoporous material, or the ZIF-8 type organic-inorganic composite nanoporous material is satisfied, the polymer matrix is partially penetrated into pores of the UiO-66 type organic-inorganic composite nanoporous material, the MIL-100 type organic-inorganic composite nanoporous material, or the ZIF-8 type organic-inorganic composite nanoporous material to improve the mutual affinity between two materials, thereby preventing a void and film curing problem. In addition, due to the uniform dispersion of the organic-inorganic composite nanoporous material in the polymer matrix, the methane adsorption capacity of the methane-selective composite membrane may be further improved.

In addition, when the content of the UiO-66 type organic-inorganic composite nanoporous material, the MIL-100 type organic-inorganic composite nanoporous material, or the ZIF-8 type organic-inorganic composite nanoporous material is out of the range of 1 to 50 wt % based on the total weight of the composite membrane, dispersion is not achieved well and the mutual bonding between the two materials does not occur well, so that the physical strength of the composite membrane may be rapidly lowered. Besides, when the content is more than 50 wt %, the methane/nitrogen selectivity is significantly lowered, which seems to be due to the fact that the high-density organic-inorganic composite nanoporous material forms a new permeation path (channel) to influence the nitrogen permeability rather than diffusion of methane.

The UiO-66 type organic-inorganic composite nanoporous material, the MIL-100 type organic-inorganic composite nanoporous material, or the ZIF-8 type organic-inorganic composite nanoporous material according to an exemplary embodiment of the present invention may have a multilayer structure, and preferably, may include a first layer including 5 to 20 wt % of the UiO-66 type organic-inorganic composite nanoporous material, the MIL-100 type organic-inorganic composite nanoporous material, or the ZIF-8 type organic-inorganic composite nanoporous material, a second layer disposed on the first layer, including 5 to 10 wt % of the UiO-66 type organic-inorganic composite nanoporous material, the MIL-100 type organic-inorganic composite nanoporous material, or the ZIF-8 type organic-inorganic composite nanoporous material, and a third layer disposed on the second layer, including 1 to 10 wt % of the UiO-66 type organic-inorganic composite nanoporous material, the MIL-100 type organic-inorganic composite nanoporous material, or the ZIF-8 type organic-inorganic composite nanoporous, based on the total weight of the methane-selective mixed matrix membrane.

In the UiO-66 type organic-inorganic composite porous material, the MIL-100 type organic-inorganic composite nanoporous material, or the ZIF-8 type organic-inorganic composite nanoporous material type methane-selective mixed matrix membrane according to an exemplary embodiment of the present invention, the multilayer structure form may have differentiated concentrations in which the content of the UiO-66 type organic-inorganic composite nanoporous material, the MIL-100 type organic-inorganic composite nanoporous material, or the ZIF-8 type organic-inorganic composite nanoporous material included in the first to third layers are in the order of the first layer>the second layer>the third layer, and when the content of the UiO-66 type organic-inorganic composite nanoporous material, the MIL-100 type organic-inorganic composite nanoporous material, or the ZIF-8 type organic-inorganic composite nanoporous material included in the first layer in the concentration order is the highest, a relative flowability of methane to a mixed gas passing through the methane-selective mixed matrix membrane may be further improved.

In addition, when the multilayer structure form having the concentration gradient is satisfied, an adsorption degree in an upper interface (retention/permeation) where the mixed gas meets, a diffusing surface (adsorption/diffusion) of gas, and a lower interface (desorption), and gaseous diffusion in the composite membrane may be adjusted so as to proceed more efficiently, thereby further improving gas separation performance.

The methane-selective mixed matrix membrane according to an exemplary embodiment of the present invention may have a methane permeability of 6 barrer or more, preferably 6 to 100 barrer, and more preferably 6 to 20 barrer, and a methane/nitrogen selectivity of 5 or more, preferably 5 to 50, and more preferably 5 to 10; more preferably a methane permeability of 7 to 20 barrer and a methane/nitrogen selectivity of 6 to 10, from a mixed gas containing methane and nitrogen.

The methane-selective mixed matrix membrane according to an exemplary embodiment of the present invention may be in the form of a thin film, a flat film, a spiral film, a tubular film, or a hollow fiber membrane.

The present invention provides a method of preparing a methane-selective mixed matrix membrane including:

(a) dissolving a polymer in a solvent to prepare a polymer solution;

(b) dispersing a UiO-66 type organic-inorganic composite nanoporous material, a MIL-100 type organic-inorganic composite nanoporous material, or a ZIF-8 type organic-inorganic composite nanoporous material having one or more methane-selective functional groups selected from the group consisting of —Br, —NH$_2$, —I, and —NO$_2$ in a solvent to prepare a UiO-66 type organic-inorganic composite nanoporous material dispersion, a MIL-100 type organic-inorganic composite nanoporous material dispersion, or a ZIF-8 type organic-inorganic composite nanoporous material dispersion;

(c) adding the polymer solution to the UiO-66 type organic-inorganic composite nanoporous material dispersion, the MIL-100 type organic-inorganic composite nanoporous material dispersion, or the ZIF-8 type organic-inorganic composite nanoporous material dispersion to prepare a mixed solution; and (d) molding the mixed solution to prepare a mixed matrix membrane.

Specifically, the polymer in step (a) may be one or more polymers selected from the group consisting of a polyether-polyamide block copolymer (PEBAX), a styrene-butadiene-styrene block copolymer (SBS), a polydimethylsiloxane (PDMS), poly(methyl propyl siloxane), poly(methyl octyl siloxane), poly(para-silphenylene siloxane), poly(silethylene siloxane), poly(silhexylene siloxane), poly(siloctylene siloxane), poly(para-silphenylene siloxane), and poly(siloctylene siloxane). Preferably, the polymer is a rubbery polymer having a relatively high methane selectivity and may be one or more polymers selected from the group consisting of a polyether-polyamide block copolymer (PEBAX), a styrene-butadiene-styrene block copolymer (SBS), polydimethylsiloxane (PDMS), poly(para-silphenylene siloxane), and poly(siloctylene siloxane), but is not limited thereto.

Specifically, the polymer in step (a) may be one or more polymers selected from the group of polyimide, polybenzimidazole, polysulfone, polyamide, and polybenzoxazole, in the methane-selective composite membrane. Preferably, the polymer is a vitreous polymer having a relatively high nitrogen selectivity and may be one or more polymers selected from the group consisting of polyimide, polybenzimidazole, polysulfone, polyamide, and polybenzoxazole, and is not limited thereto.

In addition, in step (a), the solvent is not limited as long as it dissolves the polymer, and specifically, may be one or more selected from the group consisting of N-methyl-2-pyrrolidone, dioxane, dimethylacetamide, dimethylformamide, dimethylsulfoxide, toluene, xylene, acetone, methylethylketone, r-butyrolactone, C1-6 alcohol, ethyl acetate, and glycol ether, but is not limited thereto.

Specifically, in step (b), the UiO-66 type organic-inorganic composite nanoporous material, the MIL-100 type organic-inorganic composite nanoporous material, or the ZIF-8 type organic-inorganic composite nanoporous material having one or more methane-selective functional groups selected from the group consisting of —Br, —NH2, —I, and —NO2 may be an organic-inorganic composite porous material of a UiO-66 skeleton, an organic-inorganic composite porous material of a MIL-100 skeleton, or an organic-inorganic composite porous material of a ZIF-8 skeleton, and specifically, may include one or more selected from Ui0-66_Br, Ui0-66_2Br, Ui0-66_NH2, Ui0-66_2NH2, Ui0-66_I, Ui0-66_2I, Ui0-66_NO2, and Ui0-66_2NO2 which are substituted with —Br, —NH2, —I, —COOH, and —NO2 groups, respectively, on an aromatic ring in the UiO-66 skeleton, include one or more selected from MIL-100_Br, MIL-100_NH2, MIL-100_I, MIL-100_COOH, MIL-100_NO2, and MIL-100_2Br which are substituted with —Br, —NH2, —I, —COOH, and —NO2 groups, respectively, on one aromatic ring in the MIL-100 skeleton of the MIL-100 type organic-inorganic composite porous material, or include one or more selected from ZIF-8_Br, ZIF-8_2Br, ZIF-8_NH2, ZIF-8_I, and ZIF-8_NO2, which are substituted with —Br, —NH2, —I, —COOH, and —NO2 groups, respectively, on one aromatic ring in the skeleton of the ZIF-8 type organic-inorganic composite nanoporous material, and more preferably, may include one or more selected from Ui0-66_Br, Ui0-66_2Br, Ui0-66_I, Ui0-66_2I or MIL-100_Br, MIL-100_2Br, Ui0-66_2I, MIL-66_2I, preferably one or more selected from ZIF-8_Br, ZIF-8_2Br, ZIF-8_I, and ZIF-8_2I.

In addition, the solvent used when the UiO-66 type organic-inorganic composite nanoporous material, the MIL-100 type organic-inorganic composite nanoporous material, or the ZIF-8 type organic-inorganic composite nanoporous material is dispersed may be the same as the solvent for dissolving the polymer in step (a), and a dispersion method may be a method of using ultrasonic waves and heating, but is not limited thereto.

In addition, preparation of a mixed solution in step (c) may be adding the polymer solution to the UiO-66 type organic-inorganic composite nanoporous material dispersion, the MIL-100 type organic-inorganic composite nanoporous material dispersion, or the ZIF-8 type organic-inorganic composite nanoporous material dispersion in portions several times and mixing them with stirring or using ultrasonic waves.

In addition, molding the mixed solution in step (d) may be solution casting, knife casting, tape casting, dip coating, slip coating, spray coating, ultrasonic coating, or spin coating, preferably the molding may proceed with solution casting, knife casting, or tape casting, specifically, the mixed solution is applied to a certain support and the solvent is dried by a method selected from plasma, electron radiation, heat treatment, or an optional combination thereof.

The method of preparing a methane-selective mixed matrix membrane according to an exemplary embodiment of the present invention may further include a step of repeating step (d) to prepare a composite membrane having a multilayer structure.

Specifically, the step may include (d-1) applying the mixed solution of (c) on the support and then drying the solution to produce the solution into a film form; and (d-2) molding the dried film form.

In the method of preparing a methane-selective mixed matrix membrane according to a specific exemplary embodiment of the present invention, the step (d-1) may perform the applying and drying process once or repeat the process several times, and specifically, the mixed solution may be applied in a state of being fixed to the support and dried, and the applying and drying process may be repeated twice or more on the layer of the produced film to laminate the film.

In the method of preparing a methane-selective mixed matrix membrane according to an exemplary embodiment of the present invention, step (d-2) may be separating the dried film form from the support, and stacking multiple applied films and compressing them. Here, the support is a support capable of forming a film on a surface in contact with the support and is not limited as long as the dried film is easily separated without damage, and specifically, the support may be a base material such as glass, Teflon, and stainless steel and may have a substrate form or may be a container form having a flat bottom and a constant height, but is not limited thereto.

In the method of preparing a methane-selective mixed matrix membrane according to an exemplary embodiment of the present invention, the content of the methane-adsorptive nanoporous material which is the UiO-66 type organic-inorganic composite porous material, the MIL-100 type organic-inorganic composite nanoporous material, or the ZIF-8 type organic-inorganic composite nanoporous material may be 1 to 50 wt %, based on the total weight of the entire methane-selective composite membrane.

In the method of preparing a methane-selective mixed matrix membrane according to an exemplary embodiment of the present invention, the multilayer structure may include a first layer including 5 to 20 wt % of the UiO-66 type organic-inorganic composite nanoporous material, the MIL-100 type organic-inorganic composite nanoporous material, or the ZIF-8 type organic-inorganic composite nanoporous material, a second layer disposed on the first layer, including 5 to 10 wt % of the UiO-66 type organic-inorganic composite nanoporous material, the MIL-100 type organic-inorganic composite nanoporous material, or the ZIF-8 type organic-inorganic composite nanoporous material, and a third layer disposed on the second layer, including 1 to 10 wt % of the UiO-66 type organic-inorganic composite nanoporous material, the MIL-100 type organic-inorganic composite nanoporous material, or the ZIF-8 type organic-inorganic composite nanoporous material, based on the total weight of the methane-selective composite membrane.

The method of preparing a methane-selective mixed matrix membrane according to an exemplary embodiment may further include (e) performing annealing and vacuum treatment after step (d).

The annealing according to an exemplary embodiment of the present invention may be performed at 15 to 30° C. for 10 to 48 hours and the vacuum treatment may be performed at 40 to 80° C. below atmospheric pressure to remove the solvent.

Specifically, the methane-selective mixed matrix membrane of the present invention may be subjected to pretreatment such as annealing and/or vacuum treatment before use. Through the pretreatment, the UiO-66 type organic-inorganic composite nanoporous material, the MIL-100 type organic-inorganic composite nanoporous material, or the ZIF-8 type organic-inorganic composite nanoporous material in the methane-selective composite membrane is activated to improve compactness of the UiO-66 type organic-inorganic composite nanoporous material, the MIL-100 type organic-inorganic composite nanoporous material, or the ZIF-8 type organic-inorganic composite nanoporous material with the polymer matrix or remove defects caused by a polymer gap, thereby further increasing the separation performance of the methane-selective composite membrane.

The present invention provides a method of selectively separating or concentrating methane from a mixed gas containing methane and nitrogen using a methane-selective mixed matrix membrane.

In still another general aspect, an apparatus for separating or concentrating methane includes a methane-selective mixed matrix membrane.

In the apparatus for separating or concentrating methane according to an exemplary embodiment of the present invention, the methane-selective mixed matrix membrane may be provided and used in an apparatus for separating or concentrating methane/nitrogen from a mixed gas of methane/nitrogen such as industrial by-product gas, natural gas, or shale gas containing nitrogen and methane.

Specifically, the apparatus for separating or concentrating methane may include an inlet configured to receive a supply material, a first outlet configured to discharge a non-permeated material, and a second outlet configured to discharge a permeated material. More specifically, the apparatus for separating or concentrating methane may be configured to be pressed so that the mixed gas of methane/nitrogen which is a supply material is passed through the inlet, nitrogen which is a non-permeated material is discharged through the first outlet, and methane which is a permeated material is discharged through the second outlet. The apparatus for separating or concentrating methane may be configured to receive and use the methane-selective composite membrane of the present invention in the form of a flat film, a spiral film, a tubular film, or a hollow fiber membrane.

In the method of selectively separating or concentrating methane according to an exemplary embodiment of the present invention, separation or concentration may be performed in the manner that following the mixed gas including methane and nitrogen to be separated, methane which is first permeated and has an increased purity due to a gas solubility of the methane-selective mixed matrix membrane is obtained, and nitrogen captured in the methane-selective composite membrane is desorbed and recovered to obtain nitrogen having an increased purity. Preferably, the apparatus for separating or concentrating methane according to the present invention is an apparatus capable of separating each of methane and nitrogen in the methane/nitrogen mixed gas, and may be mounted on a pressure swing adsorption (PSA) separation apparatus or a temperature swing adsorption (TSA) separation apparatus, but is not limited thereto, and may be used as a methane separation system in a known methane/nitrogen mixed gas separation apparatus.

In addition, the apparatus may be applied to a liquefaction system and a liquefaction technology to pressurize and liquefy a high-purity nitrogen or methane gas prepared using the methane-selective composite membrane according to the present invention. The gas separated is liquefied as such, thereby making transport, storage, and/or distribution of the separated gas easy.

Hereinafter, the present invention will be described in detail by the Examples, however, the Examples are for describing the present invention in more detail, and the scope of the present invention is not limited to the following Examples.

Synthesis of UiO-66 Type Organic-Inorganic Composite Nanoporous Material

The UiO-66 type organic-inorganic composite porous material of the present invention was prepared with a large-capacity reflux system, referring to the method [Ameloot, R., Aubrey, M., Wiers, B. M., GoA. P., Patel, S. N., Balsara, N. P., & Long, J. R. (2013). Ionic conductivity in the metal-organic framework UiO-66 by dehydration and insertion of lithium tert-butoxide. Chemistry—A European Journal, 19(18), 5533-5536].

[Preparation Example 1] Synthesis of UiO-66_Br

A mixture of zirconium tetrachloride (ZrCl4), 2-bromoterephthalic acid (H2BDC-Br), HCl, and DMF (N,N-dimethylformamide) was placed in a round flask at a ratio of 25 mmol: 50 mmol: 50 mmol: 150 mL, heated to a reflux temperature, and stirred for 16 hours to be reacted. A white material resulted from the reaction. The white material was filtered and recovered, and washed three times with DMF to remove unreacted H2BDC-Br. Next, the material was washed three times with acetone and dried at room temperature. The thus-synthesized material was subjected to an activation process at 250° C. in vacuo for 12 hours, and it was confirmed by XRD patterns that the UiO-66 type organic-inorganic composite porous material, Ui0-66_Br was produced, as shown in FIG. 1.

[Preparation Example 2] Synthesis of UiO-66_2Br

A product was prepared in the same manner as in Preparation Example 1 except that 2-bromoterephthalic acid ($H_2$BDC-Br) was changed to 2,5-dibromoterephthalic acid ($H_2$BDC-2Br).

[Preparation Example 3] Synthesis of UiO-66_I

A product was prepared in the same manner as in Preparation Example 1 except that 2-bromoterephthalic acid ($H_2$BDC-Br) was changed to 2-iodoterephthalic acid ($H_2$BDC-I).

[Preparation Example 4] Synthesis of UiO-66_2I

A product was prepared in the same manner as in Preparation Example 1 except that 2-bromoterephthalic acid ($H_2$BDC-Br) was changed to 2,5-diiodoterephthalic acid ($H_2$BDC-2I).

[Preparation Example 5] Synthesis of UiO-66_$NH_2$

A product was prepared in the same manner as in Preparation Example 1 except that 2-bromoterephthalic acid ($H_2$BDC-Br) was changed to 2-aminoterephthalic acid ($H_2$BDC-$NH_2$).

[Preparation Example 6] Synthesis of UiO-66_2$NH_2$

A product was prepared in the same manner as in Preparation Example 1 except that 2-bromoterephthalic acid ($H_2$BDC-Br) was changed to 2,5-diaminoterephthalic acid ($H_2$BDC-2$NH_2$).

[Preparation Example 7] Synthesis of UiO-66_$NO_2$

A product was prepared in the same manner as in Preparation Example 1 except that 2-bromoterephthalic acid ($H_2$BDC-Br) was changed to 2-nitroterephthalic acid ($H_2$BDC-$NO_2$).

[Preparation Example 8] Synthesis of UiO-66_2$NO_2$

A product was prepared in the same manner as in Preparation Example 1 except that 2-bromoterephthalic acid ($H_2$BDC-Br) was changed to 2,5-dinitroterephthalic acid ($H_2$BDC-2$NO_2$).

[Example 1] Preparation of Methane-Selective Mixed Matrix Membrane Including 2.5 wt % of UiO-66_2Br A styrene-butadiene-styrene block copolymer (SBS) (0.3 g) which is a rubbery polymer and toluene (1.5 ml) were mixed and stirred at 600 RPM for 24 hours to prepare a polymer solution. In addition, the Ui0-66_2Br (8.0 mg) synthesized in Preparation Example 2 was added to toluene (1.5 ml) and stirred at 600 RPM for 12 hours, and dispersed for 1 hour using an ultrasonic cleaner. The polymer solution was added in two or three portions to the dispersion in which Ui0-66_2Br was dispersed and mixed with stirring at 600 RPM at room temperature. The thus-prepared mixed solution was applied to a petri-dish using a solution casting method, the applied film was dried by annealing at 25° C. for 24 hours, and this process was performed a total of three times on different petri-dishes from each other. The applied film was separated from the petri-dish and toluene was dried at 60° C. in vacuo for completely removing the remaining solvent to prepare a methane-selective composite membrane in a free-standing form.

[Example 2] Preparation of Methane-Selective Mixed Matrix Membrane Including 5.0 wt % of UiO-66_2Br A methane-selective mixed matrix membrane was prepared in the same manner as in Example 1, except that in the preparation of the methane-selective composite membrane, the use amount of UiO-66_2Br was changed (15 mg).

[Example 3] Preparation of Methane-Selective Mixed Matrix Membrane Including 10.0 wt % of UiO-66_2Br A methane-selective mixed matrix membrane was prepared in the same manner as in Example 1, except that in the preparation of the methane-selective composite membrane, the use amount of UiO-66_2Br was changed (33.0 mg).

[Example 4] Preparation of Methane-Selective Mixed Matrix Membrane Including 20.0 wt % of UiO-66_2Br A methane-selective mixed matrix membrane was prepared in the same manner as in Example 1, except that in the preparation of the methane-selective composite membrane, the use amount of UiO-66_2Br was changed (50.0 mg).

[Example 5] Preparation of Methane-Selective Mixed Matrix Membrane Including 50.0 wt % of UiO-66_2Br A methane-selective mixed matrix membrane was prepared in the same manner as in Example 1, except that in the preparation of the methane-selective composite membrane, the use amount of UiO-66_2Br was changed (300.0 mg).

[Comparative Example 1] Preparation of (SBS) Polymer Membrane

A (SBS) polymer membrane was prepared in the same manner as in Example 1, except that the UiO-66_2Br dispersion was not used by excluding the step of preparing the UiO-66_2Br dispersion.

[Experimental Example 1] SEM Analysis of Methane-Selective Mixed Matrix Membrane In order to observe the structural characteristic of the methane-selective mixed matrix membrane including the UiO-66 type organic-inorganic composite nanoporous material and the polymer matrix, an FE-SEM (TESCAN MIRA3, USA) image was measured. The membrane of Example 3 was used as a measurement sample, which was coated with platinum for 120 seconds, and the surface and the cross section thereof were measured.

Figure 2:
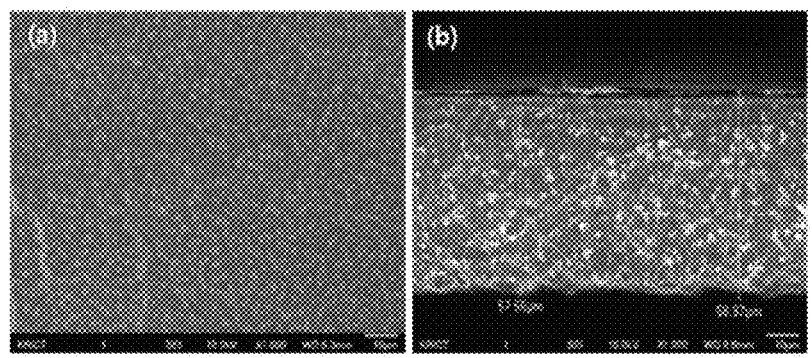
FIG. 2 is images representing (a) the surface and (b) the section of the composite membrane of Example 3, in which dispersion in the polymer matrix and a binding state to the polymer matrix, of the UiO-66 type organic-inorganic composite nanoporous material may be confirmed, using scanning electron microscope (SEM) analysis.

The images in which the measured surface and cross section of the methane-selective mixed matrix membrane were analyzed are shown in FIG. 2.

As seen from FIG. 2, it was confirmed from the surface and cross section image that in the methane-selective mixed matrix membrane of the present invention, UiO-66_2Br interacted with each other and was uniformly dispersed in the form of being bonded and entangled in the polymer (SBS) matrix, and the thickness of the methane-selective composite membrane prepared including 10 wt % of the UiO-66_2Br based on the total weight of the composite membrane was confirmed to be 58 μm.

Figure 3:
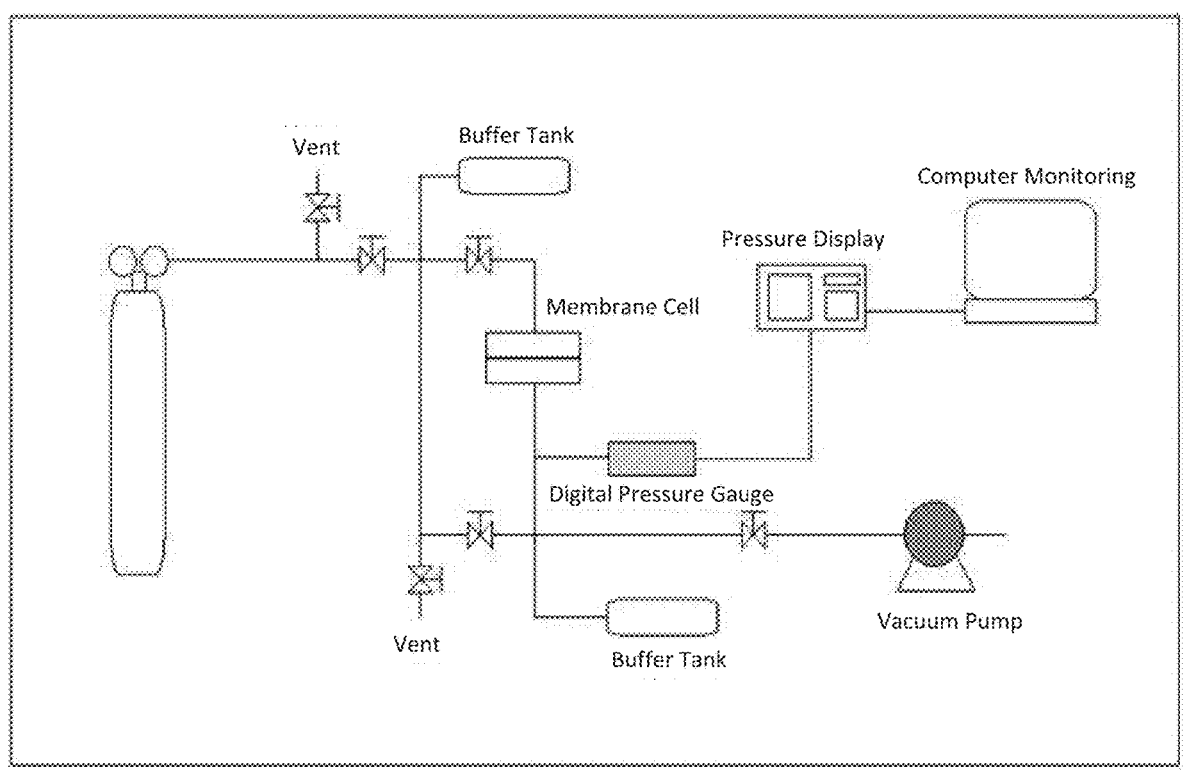
FIG. 3 is a drawing representing a schematic diagram of a time-lag device for evaluating separation performance of the methane-selective mixed matrix membrane.

[Experimental Example 2] Evaluation of Methane Permeation Performance of Methane-Selective Mixed Matrix Membrane In order to evaluate the methane separation performance of the mixed matrix membrane including UiO-66_2Br as the organic-inorganic composite nanoporous material to which a methane-selective functional group was introduced in the methane-selective composite membrane prepared in Example 1, time-lag method was used. The time-lag method is a method in which a subject gas is introduced to a chamber having a constant volume and a pressure change over time and a permeated amount through the membrane are represented as a function of time, which is used to measure a permeation coefficient, a diffusion coefficient, and dissolution coefficient of the gas, and a schematic view of the time-lag apparatus for evaluating the separation performance of the methane-selective mixed matrix membrane of the present invention is shown in FIG. 3.

In the measurement method, the gas to be measured is supplied at a constant pressure through a supply unit while simultaneously, a permeation amount is measured by a mass flow meter (MFM) connected to the permeation unit, a pressure change amount was measured by a pressure transducer, a permeation degree and a diffusion degree are analyzed, a solubility is measured based thereon, and the permeability and the selectivity are calculated from the following Equations 1 and 2:

$$P = \frac{dp}{dt}\left(\frac{VT_0L}{p_0T\Delta pA}\right) \quad \text{[Equation 1]}$$

wherein P represents a permeability having a unit of barrer ($10^{-10}$ cm$^3$(STP)cm/cm$^2$·sec·cmHg) and is derived from a slope (dp/dt) of a tangent in a normal state, V represents a chamber capacity (cm$^3$), L is a film thickness (cm), $\Delta p$ represents a pressure difference (cmHg) between an upper and a lower, A represents an effective film area (cm$^2$), and $T_0$ and $P_0$ represent a standard temperature (K) and a standard pressure (cmHg), $$\alpha_{A/B} = P_A/P_B \quad \text{[Equation 2]}$$

wherein $\alpha_{A/B}$ represents an ideal selectivity of single gases A and B, and PA represents a permeability of a single gas A, and $P_B$ represents a permeability of a single gas B.

The permeability and the selectivity of methane in relation to the addition amount change of the organic-inorganic composite nanoporous material to which the methane-selective functional group was introduced are shown in Tables 1 and 2.

The measurement using the time-lag apparatus of FIG. 3 was performed under conditions in a membrane cell (16 cm$^2$), at an operation pressure of 3 bar, and at an operation temperature of 0° C., and the separation performance of methane depending on the addition amount change of the organic-inorganic composite porous material to which a methane-selective functional group was introduced was measured. Here, the addition amount of the organic-inorganic composite porous material was calculated from the following Equation 3:

[Equation 3]

Addition amount of organic – inorganic composite porous body (wt%) =

$$\frac{\text{Addition amount of organic -}}{\text{inorganic composite porous body (g)}}{\text{Addition amount of organic -}}$$
inorganic composite porous body (g)+
Polymer (g)

Through Equations 1 to 3, the methane permeability and the methane/nitrogen selectivity of the methane-selective mixed matrix membrane from the methane/nitrogen mixed gas were calculated, and the results of separation performance evaluation are shown in the following Table 1:

TABLE 1

| Classification | Addition amount of UiO-66_2Br (wt %) | Permeation (Barrier) CH$_4$ | N$_2$ | Selectivity (CH$_4$/N$_2$) |
|---|---|---|---|---|
| Comparative Example 1 | 0 | 4.2 | 0.9 | 4.7 |
| Example 1 | 2.5 | 6.3 | 1.1 | 5.7 |
| Example 2 | 5.0 | 18.0 | 2.3 | 7.8 |

TABLE 1-continued

| Classification | Addition amount of UiO-66_2Br (wt %) | Permeation (Barrier) CH$_4$ | Permeation (Barrier) N$_2$ | Selectivity (CH$_4$/N$_2$) |
|---|---|---|---|---|
| Example 3 | 10.0 | 7.3 | 1.0 | 7.3 |
| Example 4 | 20.0 | 8.3 | 1.2 | 6.9 |
| Example 5 | 50.0 | 9.0 | 1.7 | 5.3 |

As seen from Table 1, it was shown that in Comparative Example 1 like the conventional polymer film, methane/nitrogen gas molecules were permeated into a space between polymer chains, while in the methane-selective composite membrane prepared in Examples 1 to 5, the organic-inorganic porous material to which the methane-selective functional group was introduced was mixed to form various permeation paths to significantly improve a gas solubility and increase both a permeation amount and a selectivity of methane.

In particular, for the permeability of the methane-selective mixed matrix membrane, Example 2 to which 5.0 wt % of the organic-inorganic composite nanoporous material to which the methane-selective functional group was introduced was added showed a methane permeability increased by 4 times or more as compared with Comparative Example 1 which is the (SBS) polymer film itself.

In addition, for the methane/nitrogen selectivity of the methane-selective mixed matrix membrane, Examples 2 and 3 to which 5.0 to 10 wt % of the organic-inorganic composite nanoporous material to which the methane-selective functional group was introduced was added showed a selectivity of 7 or more, which was confirmed to be improved by 1.6 times or more as compared with Comparative Example 1.

Accordingly, the methane-selective mixed matrix membrane including the UiO-66 type organic-inorganic composite nanoporous material, the MIL-100 type organic-inorganic composite nanoporous material, or the ZIF-8 type organic-inorganic composite nanoporous material having one or more methane-selective functional groups selected from the group consisting of —Br, —NH$_2$, —I, and —NO$_2$, of the present invention has a methane adsorption property introduced to increase a solubility of the composite membrane in methane, thereby improving a selective permeability of methane, and it was confirmed that this is a very excellent membrane technique which allows methane to be selectively separated from biogas or natural gas, and has a very high applicability in the fields of new renewable energy and chemical raw materials such as high-purity hydrogen/methane separation, olefin/paraffin separation, carbon monoxide/methane separation, and carbon dioxide/methane separation and gas separation/purification such as air cleaning filters from now on.

The methane-selective mixed matrix membrane including the UiO-66 type organic-inorganic composite nanoporous material, the MIL-100 type organic-inorganic composite nanoporous material, or the ZIF-8 type organic-inorganic composite nanoporous material having specific functional groups, —Br, —NH$_2$, —I, and —NO$_2$ according to the present invention have a very excellent methane adsorption property and high methane separation performance from a mixed gas containing methane and nitrogen.

More specifically, the methane-selective mixed matrix membrane of the present invention has a high methane permeability and a very excellent methane/nitrogen selectivity.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope of the spirit of the invention.

What is claimed is:

1. A methane-selective mixed matrix membrane comprising:
    a UiO-66 type organic-inorganic composite nanoporous material, a MIL-100 type organic-inorganic composite nanoporous material, or ZIF-8 type organic-inorganic composite nanoporous material; and
    a polymer matrix,
    wherein the methane-selective mixed matrix membrane has a methane permeability of 6 barrer or more and a methane/nitrogen selectivity of 5 or more from a mixed gas containing methane and nitrogen.

2. The methane-selective mixed matrix membrane of claim 1, wherein the UiO-66 type organic-inorganic composite nanoporous material, the MIL-100 type organic-inorganic composite nanoporous material, or the ZIF-8 type organic-inorganic composite nanoporous material independently of each other includes a UiO-66 skeleton, a MIL-100 skeleton, or a ZIF-8 skeleton having one or more methane-selective functional groups selected from the group consisting of —Br, —NH$_2$, —I, and —NO$_2$.

3. The methane-selective mixed matrix membrane of claim 2, wherein:
    the UiO-66 type organic-inorganic composite nanoporous material includes one or more selected from Ui0-66_Br, UiO-66_2Br, UiO-66_NH$_2$, Ui0-66_2NH$_2$, Ui0-66_I, Ui0-66_2I, Ui0-66_NO$_2$, and Ui0-66_2NO$_2$ which are substituted with —Br, —NH$_2$, —I, —COOH, and —NO$_2$ groups, respectively, on an aromatic ring in the UiO-66 skeleton,
    the MIL-100 type organic-inorganic composite nanoporous material includes one or more selected from MMIL-100_Br, MIL-100_NH$_2$, MIL-100_I, MIL-100_COOH, MIL-100_NO$_2$, and MIL-100_2Br which are substituted with —Br, —NH$_2$, —I, —COOH, and —NO$_2$ groups, respectively, on one aromatic ring in the MIL-100 skeleton, and
    the ZIF-8 type organic-inorganic composite nanoporous material includes one or more selected from ZIF-8_Br, ZIF-8_2Br, ZIF-8_NH$_2$, ZIF-8_I, and ZIF-8_NO$_2$ which are substituted with —Br, —NH$_2$, —I, —COOH, and —NO$_2$ groups, respectively, on one aromatic ring in the ZIF-8 skeleton.

4. The methane-selective mixed matrix membrane of claim 1, wherein the polymer matrix is one or more rubbery polymers selected from the group consisting of a polyether-polyamide block copolymer (PEBAX), a styrene-butadiene-styrene block copolymer (SBS), polydimethylsiloxane (PDMS), poly(para-silphenylene siloxane), and poly(siloctylene siloxane), or one or more vitreous polymers selected from the group consisting of polyimide, polybenzimidazole, polysulfone, polyamide, and polybenzoxazole.

5. The methane-selective mixed matrix membrane of claim 1, wherein the UiO-66 type organic-inorganic composite nanoporous material, the MIL-100 type organic-inorganic composite nanoporous material, or the ZIF-8 type organic-inorganic composite nanoporous material are included at 1 to 50 wt % in a form of being dispersed in the polymer matrix, based on a total weight of the methane-selective mixed matrix membrane.

6. The methane-selective mixed matrix membrane of claim 5, wherein the methane-selective mixed matrix membrane is in a form of a multilayer structure.

7. The methane-selective mixed matrix membrane of claim 6, wherein the multilayer structure includes a first layer including 5 to 20 wt % of the UiO-66 type organic-inorganic composite nanoporous material, the MIL-100 type organic-inorganic composite nanoporous material, or the ZIF-8 type organic-inorganic composite nanoporous material, a second layer disposed on the first layer, including 5 to 10 wt % of the UiO-66 type organic-inorganic composite nanoporous material, the MIL-100 type organic-inorganic composite nanoporous material, or the ZIF-8 type organic-inorganic composite nanoporous material, and a third layer disposed on the second layer, including 1 to 10 wt % of the UiO-66 type organic-inorganic composite nanoporous material, the MIL-100 type organic-inorganic composite nanoporous material, or the ZIF-8 type organic-inorganic composite nanoporous material, based on the total weight of the methane-selective mixed matrix membrane.

* * * * *